United States Patent
Reynes et al.

(10) Patent No.: US 7,148,272 B2
(45) Date of Patent: Dec. 12, 2006

(54) BIODEGRADABLE MATERIAL BASED ON POLYMER AND CEREAL FLOUR, METHOD FOR MAKING SAME AND USES

(75) Inventors: Pierre Reynes, Riom (FR); Arnaud Messager, Riom (FR)

(73) Assignee: Ulice (S.A.) (FR)

( * ) Notice: Subject to any disclaimer, the term of this patent is extended or adjusted under 35 U.S.C. 154(b) by 0 days.

(21) Appl. No.: 09/800,013

(22) Filed: Mar. 5, 2001

(65) Prior Publication Data

US 2001/0031297 A1    Oct. 18, 2001

Related U.S. Application Data

(63) Continuation of application No. PCT/FR99/02151, filed on Sep. 9, 1998.

(30) Foreign Application Priority Data

Sep. 9, 1998    (FR) .................................. 98 11269

(51) Int. Cl.
*C08L 3/00*    (2006.01)
*D21H 19/58*    (2006.01)
(52) U.S. Cl. ..................... 524/47; 524/52; 106/125.1
(58) Field of Classification Search ............... 524/47, 524/52; 106/125.1
See application file for complete search history.

(56) References Cited

U.S. PATENT DOCUMENTS

| | | | | |
|---|---|---|---|---|
| 4,172,054 | A | * | 10/1979 | Ogawa et al. ............... 524/18 |
| 5,118,725 | A | * | 6/1992 | Suominen ................... 523/122 |
| 5,320,669 | A | * | 6/1994 | Lim et al. ................... 106/157 |
| 5,609,817 | A | * | 3/1997 | Patil et al. .................. 264/564 |

FOREIGN PATENT DOCUMENTS

| | | |
|---|---|---|
| EP | 0 421 413 A1 | 4/1991 |
| FR | 2 610 635 A1 | 12/1988 |
| JP | 50 073942 A | 6/1975 |
| WO | WO 93/05668 A | 4/1993 |

OTHER PUBLICATIONS

Ramkumar D H S et al. "Properties of Injection Moulded Starch/Synthetic Polymer Blends-II. Evaluation of Mechanical Properties." Eur. Polym. J. vol. 33, No. 5, pp. 729-742 1997.

* cited by examiner

*Primary Examiner*—Peter D. Mulcahy
(74) *Attorney, Agent, or Firm*—DLA Piper US LLP

(57) ABSTRACT

A biodegradable material comprising a mixture of at least one polymer with at least one cereal grain flour and, optionally, one or more acceptable additives.

11 Claims, 3 Drawing Sheets

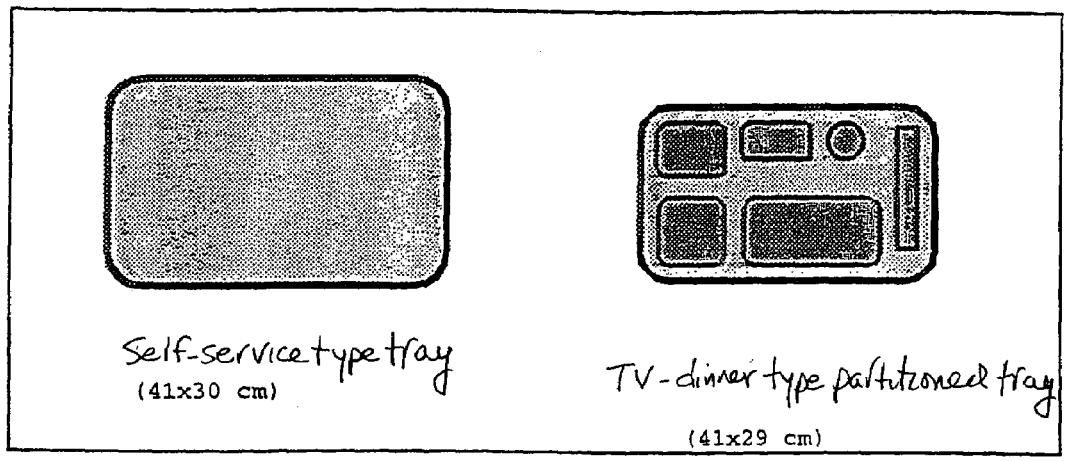
Figure 3: Injection-molded meal trays made of biodegradable material

BIODEGRADABLE MATERIAL BASED ON POLYMER AND CEREAL FLOUR, METHOD FOR MAKING SAME AND USES

CROSS-REFERENCE TO RELATED APPLICATION

This is a continuation of International Application No. PCT/FR99/02151, with an international filing date of Sep. 9, 1998, which is based on French Patent Application No. 98/11269, filed Sep. 9, 1998.

FIELD OF THE INVENTION

The invention pertains to the field of the biodegradability of plastic materials and concerns the development of composite materials based on polymers and cereal grain flours. These biodegradable materials are intended to replace the synthetic plastics used in numerous fields of activity such as cosmetology, pharmacy and food processing, for example, as a packaging product.

BACKGROUND

Synthetic polymers are used in very numerous industrial fields, particularly in the packaging field, because they exhibit at least the following three advantages:
  easily molded,
  very good physicochemical properties,
  low cost.

But the principal disadvantage of these materials is that they can not be biodegraded, after use, via natural and ecological pathways. Plastic waste products thus become very major polluting agents. The only principal approaches employed today are recycling and incineration. But this only represents a small volume and generates very high costs.

Biodegradability can be defined as the physical and/or chemical degradation at the molecular level of the substances by the action of environmental factors (particularly the enzymes stemming from the metabolic processes of microorganisms.)

Known in the prior art are biodegradable materials that can be substituted for synthetic plastic materials.

First of all, one can cite the biodegradable materials stemming from a mixture of a polymer and a surface-modified starch described, for example, in U.S. Pat. Nos. 1,485,833, 1,487,050, 4,021,388 and 4,125,495 and European Patent No. 45 621. This chemical modification of the surface state of the starch enables creation of ether or ester functions or making the surface of the starch hydrophobic.

It has also been proposed to use materials formed by a polymer and a destructured starch, i.e., a starch having been subjected to a specific pretreatment by a destructuring agent such as urea, the hydroxides of alkali metals or alkaline-earth metals, as described in European Patent Nos. 437 589,437 561 and 758 669, or by water as described in U.S. Pat. No. 5,095,054. The invention described in European Patent No. 535 994 does not employ the term destructured starch, but rather the term gelatinized in that the starch is heated at 40° C. in the presence of water, from 1 to 45% by weight, for a sufficiently long period of time to cause the starch granules to burst.

Methods for producing biodegradable materials constituted of starch, polymers other than propylene and additives have also been described. These additives can be unsaturated chemical compounds such as natural rubber or elastomers as described in European Patent No. 363 383, or plant materials such as wood flour or cellulose as described in European Patent No.652 910, or a plasticizer such as the polyols, glycerol, calcium chloride or ethers as described in European Patent Nos. 473 726 and 575 349, and U.S. Pat. No. 5,393,804. Among the envisaged polymers, one can cite poly(ethylene/vinyl alcohol) and poly(ethylene/acrylic acid) proposed in European Patent Nos. 400 532, 413 798 and 436 689, or aliphatic copolymers and polyesters as proposed in European Patent No. 539 541, or low-density polyethylene as proposed in PCT Patent Application No. WO 91/15542 and U.S. Pat. No. 5,162,392. Finally, European Patent No. 560 244 proposes the use of starch with at least 80% by weight of amylopectin, whereas in our case amylopectin represents a maximum of 73% of the starch present in the flours used.

Finally, it has been envisaged to prepare biodegradable materials from starch mixed with polymers that have been chemically modified so as to be able to react with the hydroxyl groups of the starch and thereby create bonds between the polymer and the starch. These techniques are described, for example, in European Patent Nos. 554 939 and 640 110.

SUMMARY OF THE INVENTION

In one aspect, the invention includes a biodegradable material including a mixture of at least one polymer with at least one cereal grain flour and, optionally, one or more acceptable additives.

In another aspect, the invention includes a process for preparing a biodegradable material consisting of mixing and heating at a temperature between about 10 and about 500° C., a cereal grain flour with an average granulometry between about 0.1 and about 2000 µm, and having a percentage by weight of water between about 0 and about 30%, and at least one polymer and, optionally, an additive.

BRIEF DESCRIPTION OF THE DRAWINGS

Other advantages and characteristics of the invention will become manifest from the examples below concerning the preparation and use of a biodegradable material according to the invention with reference to the attached figures in which:

FIG. 3 shows meal trays made from a biodegradable material according to the processes described by the invention.

DETAILED DESCRIPTION

Figure 1:
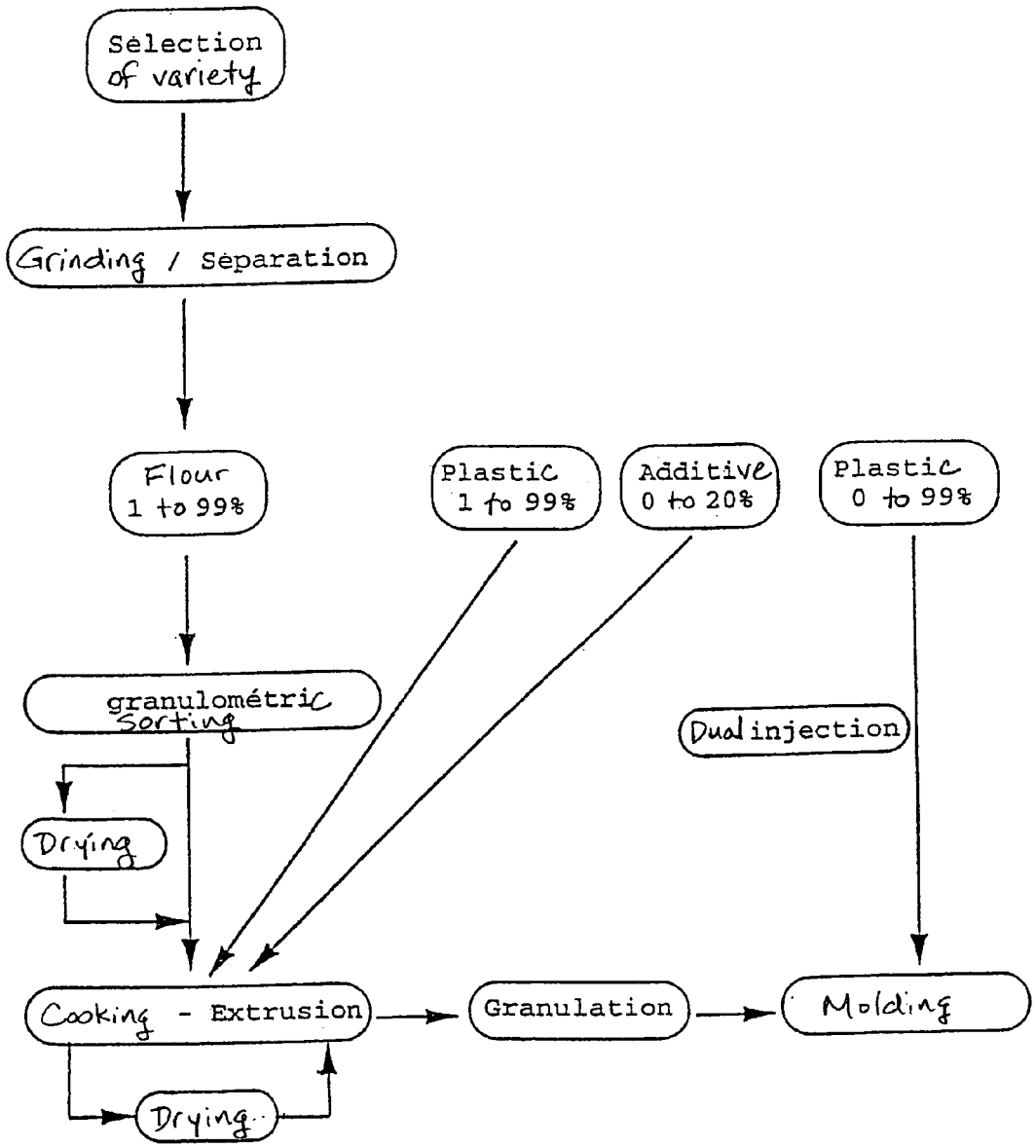
FIG. 1 is a schematic summary of a dual injection process according to the invention.

A goal of the invention is to provide a new biodegradable material that is easy to manufacture and capable of replacing the polluting plastic materials. This goal is achieved by means of a biodegradable material comprising a polymer, characterized in that it is constituted by the mixture of at least one polymer with at least one cereal grain flour and possibly one or more acceptable additives.

In the biodegradable material of the invention:
  the polymer brings its mechanical properties, the ease with which it can be molded by extrusion and injection techniques, its low density, its rheological properties and its inertness to moisture, the cereal grain flour brings its biodegradability, its rheological properties, its natural coloration, its odor and its low cost.

The biodegradable material of the invention distinguishes itself from plastic and similar materials proposed in the prior art by the fact that it is produced from cereal grain flour and not from starch, which makes it possible to employ all of the properties of all of the constitutive elements of a cereal grain flour. In addition, these cereal grain flour are not subjected to any treatment, such as, e.g., gelatinization or destructuring or surface modification of the starches, as proposed in the processes of the prior art.

In addition, the polymers employed in the biodegradable material of the invention are advantageously not modified chemically and consequently do not have functional groups capable of reacting with the hydroxyl groups of the starch or the proteins present in a cereal grain flour, which property facilitates its degradability. This partial (biofragmentation) or total degradability can furthermore be stimulated by the presence of specific agents associated with the degradation of the cereal grain flour.

Finally, the biodegradable material of the invention does not contain plasticizers such as glycerol or urea.

It should be noted that the term "cereal grain flour" used in the invention describes plant materials stemming from cereal grains whose compositions, in relation to the various base ingredients, are the following (percentages by weight):
  water content between about 0 and 20%,
  content of carbohydrate compounds between about 0 and about 85%, with the starch content thereof being between about 0 and about 80%,
  content of proteins between about 0 and about 30%,
  content of fatty acids between about 0 and about 10%,
  content of minerals between about 0 and about 5%,
  content of fibers between about 0 and about 20%.

The terms carbohydrate compounds, proteins, fatty acids, minerals and fibers, are understood to refer to the multiple products and molecules described classically by numerous reference authors in the field of the compositions of cereal materials. An example is: "The composition of foods. Tables of the nutritive values."—Souci/Fachmann/Kraut—Fifth Edition—CRC Press.

Table I presents as an example cereal grain flours that can be used in accordance with the invention: wheat flours (type T55), corn meals and whole wheat flours.

TABLE I

| | Water | Starch | Fibers | Proteins | Fatty acids | Remainder |
|---|---|---|---|---|---|---|
| Wheat flour T55 | 13.7% | 70.6% | 4.1% | 9.84% | 1.13% | 0.63% |
| Whole wheat flour | 13.2% | 58.16% | 10.3% | 11.73% | 2.00% | 4.61% |
| Corn meal | 12% | 66.29% | 9.42% | 8.31% | 2.82% | 1.16% |

It is possible to modify the constitution of a cereal grain flour by various techniques. We can cite, for example, drying which makes it possible to reduce the moisture content or turboseparation which makes it possible to separate a cereal grain flour into two fractions of different granulometries: one richer in starch (large particles) and one richer in proteins (small particles).

With regard to starch, which is an important element in a flour, it is constituted by a mixture of two glucose polymers: amylose and amylopectin. The ratio between these two molecules varies with the cereals and the varieties as shown in Table II below for native wheat and corn and two corn varieties.

TABLE II

| | Native wheat | Native corn | Waxy corn | High amylose corn |
|---|---|---|---|---|
| % amylose | 25 | 27 | 0 | 55–75 |
| % amylopectin | 75 | 73 | 100 | 25–45 |

It should be noted that the amylose/amylopectin ratio can be modified by genetic transformations of natural strains.

The biodegradable material according to the invention is constituted advantageously by a cereal grain flour in which the amylopectin represents a maximum of about 73% of the starch present in this cereal grain flour.

The biodegradable material of the invention is remarkable in that it comprises the totality of the constituents of a cereal grain flour and not just the starch. This makes it possible not only to eliminate all of the starch extraction techniques but also to use the properties of certain constituents of the cereal grain flour, such as lubrication by the fatty acids, improvement of the mechanical performance and flexibility due to the cellulose fibers, the natural coloration and aroma due to the partial destruction of the proteins when the material is prepared.

In addition, when preparing the biodegradable material of the invention it is possible to select a certain variety of cereal grain flour selected such that, for example, the amylose/amylopectin ratio is the most favorable for the plasticization of the starch.

Finally, the biodegradable material of the invention offers the advantage that it is easy and inexpensive to prepare. In fact, it is prepared by simply creating a mixture of the cereal grain flour and the polymer. When the cereal grain flour degrades under the effect of various processes, embrittlement of the polymer chains is produced, which can be accelerated by employing oxidizing agents, thereby enabling degradation of the plastic. In this manner, one obtains complete elimination of the plant part and partial degradation (fragmentation) or total degradation of the polymer part.

The biodegradable materials of the invention can be incinerated or recycled if they are recovered quickly.

Table III below summarizes the advantages and disadvantages of the plastics of the prior art and the biodegradable materials of the invention.

TABLE III

| | Plastics of the prior art | Biodegradable materials of the invention |
|---|---|---|
| Advantages | easy to mold good physiochemical properties low cost | biodegradable very low cost physiochemical properties easy to mold natural coloration |
| Disadvantages | not biodegradable polluting waste products | |

The polymers employed in the composition of the biodegradable materials of the invention are, for example, advantageously selected from the following groups:

synthetic polymers: especially polyethylene, polypropylene, polystyrene, PVC, with fluidity indices (MFI) comprised between about 0.1 and about 300 (in g/10 min under a load of 2.16 kg at 230° C.), biodegradable polymers: BIOPOL®, BAK®, ECO-PLA®, BIOMAX®, MATER-BI®, ECOFLEX®.

The cereal grain flour comprised within the composition of the biodegradable materials of the invention are obtained from wheat or corn grains, but also from a mixture of wheat flour and corn meal and thus comprising from 0 to 100% by weight of wheat flour.

The cereal grain flours preferably exhibit:
a high level of amylose to promote the fluidity of the plasticized cereal grain flour,
a low level of proteins to limit the aroma and the natural color.

The additives possibly present in the biodegradable materials of the invention are selected in particular from among the following groups:
pigments in master-batch form or in liquid form,
synthetic or natural aromas,
antistatic agents,
oxidizing agents,
natural fibers (hemp, flax, corncobs, bran for example),
compatibilizing agents (which graft the polymers to each other), that are acceptable for the pharmaceutical use or food processing use of the materials of the invention.

The following composition of a biodegradable material according to the invention can be cited as an example:
a content by weight of polymer between about 0.1 and about 99.9%, for example between about 1 and about 99%, preferably between about 1 and about 50%,
a content by weight of cereal grain flour between about 0.1 and about 99.9%, for example between about 1 and about 99%, preferably between about 50 and about 99%,
a content by weight of the totality of the additives between about 0 and about 20%.

The invention also pertains to the preparation of the previously described biodegradable material. Such a process consists of mixing and heating at a temperature between about 10 and about 500° C., and preferably between about 20 and about 300° C., a cereal grain flour of average granulometry between about 0.1 and about 2000 µm and which presents a weight percentage of water between about 0 and about 30%, and at least one polymer and possibly an additive. The average granulometry of the cereal grain flour is in an advantageous manner between about 10 and about 2000 µm, and in a particularly advantageous manner between about 10 and about 50 µm.

The cereal grain flours used for the preparation of the biodegradable material of the invention according to the process below can be prepared in the following manner:
after selection of the cereal grain varieties preferably of wheat or corn for the criteria selected (high amylose content and low protein content) linked to their varietal characteristics, they are ground by means of conventional techniques in order to obtain the cereal grain flour,
these cereal grain flours are then subjected to a controlled drying in order to eliminate the moisture so as to avoid excessive degassing during the subsequent molding steps. The percentage by weight of water of the cereal grain flour used in the process of the invention is between about 0 and about 30%. It should be noted that this drying step can be implemented either before mixing with the polymer and/or the additive(s) or during the mixing by means of degassing modules, the cereal grain flours can be subjected to a sifting and/or turboseparation phase. The cereal grain flours prepared in this manner have average granulometries, referred to as D50, between about 0.1 and about 2000 µm, for example, between about 10 and about 1000 µm.

The mixing and heating of the process according to the invention consists advantageously of a twin-screw or single-screw cooking-extrusion.

This operation can be performed in a cooker-extruder of the type BC 45 marketed by the CLEXTRAL company.

The parameters associated with the cooking-extrusion are presented in Table IV below.

TABLE IV

|  | Material flow rate (kg/h) | % water added | Temperature (° C.) | Screw speed (rpm) |
|---|---|---|---|---|
| Minimum | 1 | 0 | 20 | 5 |
| Maximum | 200 | 20% | 300 | 300 |

Advantageously, after heating the biodegradable material is cooled then ground by any suitable technique in order to obtain granules.

The biodegradable material obtained in this manner can be used for the manufacture of various objects such as container packaging constituted entirely or partially of said material. The invention also pertains to these objects and their preparation by the molding of the biodegradable material.

The molding of the biodegradable material can be performed by any method known by the expert in the field such as those used in plastics technology, among which the following can be cited: single-material or multiple-material injection (for example, dual injection), extrusion blow-molding, thermoforming. The temperatures for the implementation of these various techniques are between about 10 and about 500° C., preferably between about 20 and about 300° C. The molds employed can be cold or hot. Their maximum temperature is on the order of 150° C.

According to one particular form of implementation of the process for molding the biodegradable material of the invention, one or more polymers are added during said molding by means of a dual injection process.

The polymer content can represent between about 0 and about 99% by weight of the total molded material.

EXAMPLE 1

Production of a Biodegradable Pill Bottle

The cereal grain flour used in this example is a corn mail dried to about 1.2% water content.

The fluidity index (MFI=Melt Flour Index or grade) of the polypropylene employed is 55 g/10 min at 230° C. under 2.16 kg.

The biodegradable material contains 60% by weight of cereal grain flour.

Table V below presents the various parameters employed during the cooking-extrusion of this mixture.

TABLE V

| Temperature (° C.) | 190 |
|---|---|
| Material flow rate (kg/h) | 20 |

TABLE V-continued

| | |
|---|---|
| Water added (liters/h) | 0 |
| Screw speed (rpm) | 80 |

Figure 2:
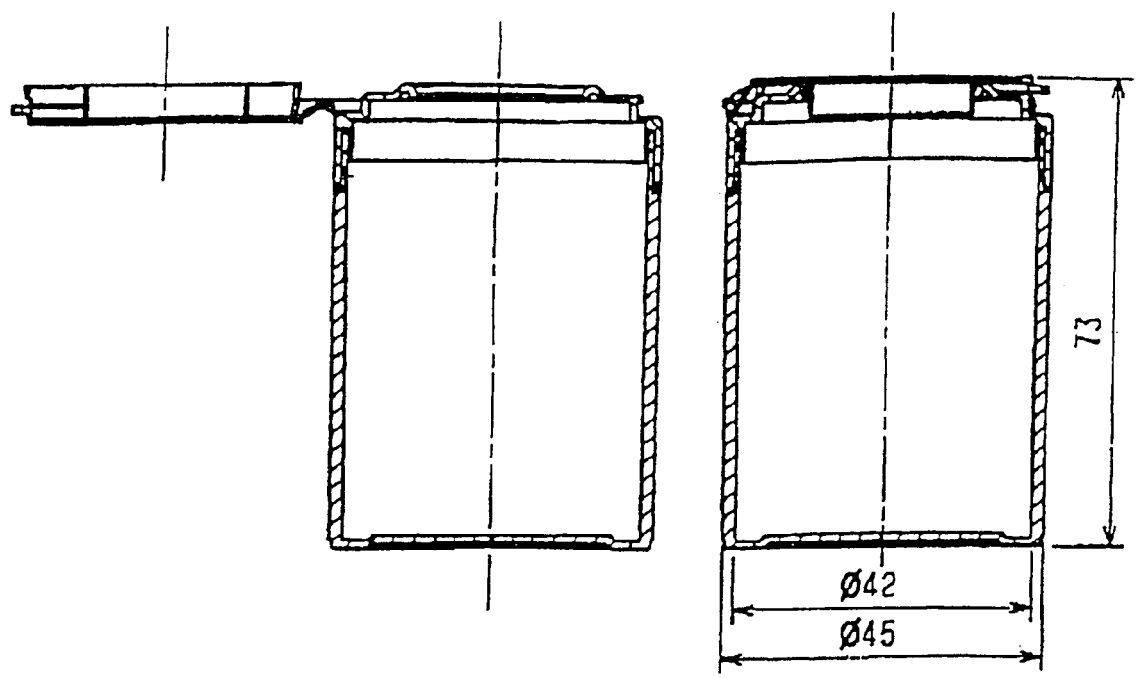
FIG. 2 shows a biodegradable pill bottle produced according to a process and from a biodegradable material in accordance with the invention.

The resultant material is cooled, granulated and then dual injected between 180 and 220° into a cold mold so as to obtain the pill bottle shown in FIG. 2. The principal physicochemical properties of this packaging material are summarized in Table VI below.

TABLE VI

| | Biodegradable material | Polypropylene |
|---|---|---|
| Residual moisture | 0 to 10% | <0.02% |
| Stress at flexural rupture (MPa) | 25 | 36 |
| Young's elasticity module (GPa) | 2.5 | 1.6 |

The results in Table VI show that the biodegradable material obtained in accordance with the invention preserves a good value for stress at flexural rupture and furthermore makes it possible to obtain improved rigidity.

EXAMPLE 2

Production of Biodegradable Meal Trays

The biodegradable raw material used is identical to that of example 1, i.e., it contains 60% by weight of corn meal and 40% by weight of polypropylene (grade 55).

In this second example, the molding technique selection is direct injection of the biodegradable material. The injection temperature of the biodegradable material is between 170 and 220° C. The mold is heated between 20 and 130° C.

FIG. 3 shows meal trays fabricated by means of the processes described by the invention.

For this application, the advantages associated with the use of a plant-matrix material as a replacement for a virgin or charged synthetic polymer are the following:
  low cost of the raw material,
  raw material more rigid than a plastic,
  raw material exhibiting respect for the environment after use.

What is claimed is:

1. A biodegradable material comprising a mixture of at least one polymer with at least one cereal grain flour, which is not subject to treatment, and having average granulometry between 10 and 2000 μm and, optionally, one or more acceptable additives, wherein the polymer is not chemically modified and is selected from the group consisting of polypropylenes, polystyrenes and PVC.

2. The biodegradable material according to claim 1, wherein the cereal grain flour is selected from the group consisting of wheat flour, corn meal and mixtures thereof.

3. The biodegradable material according to claim 1, wherein the cereal grain flour comprises 0 to 100% by weight of wheat flour.

4. The biodegradable material according to claim 1, wherein the cereal grain flour has a high level of amylose and a low level of proteins.

5. The biodegradable material according to claim 1, wherein amylopectin in the cereal grain flour represents a maximum of about 73% of starch present in the cereal grain flour.

6. The biodegradable material according to claim 1, wherein the polymer has a fluidity index between about 0.1 and about 300 g/10 mm at 230° C. under 2.16 kg.

7. The biodegradable material according to claim 1, wherein the polymer is a biodegradable polymer.

8. The biodegradable material according to claim 1, wherein the additive is selected from the group consisting of pigments, synthetic aromatics, natural aromatics, antistatic agents, oxidizing agents, compatibilizing agents and natural fibers selected from the group consisting of hemp, flax, corncobs and bran.

9. An object made in whole or in part from a biodegradable material according to claim 1.

10. The biodegradable material defined in claim 1, wherein the polymer is not chemically modified.

11. The biodegradable material defined in claim 1, wherein the polymer does not have functional groups which react with hydroxyl groups of starch or proteins in the cereal grain flour.

* * * * *